June 5, 1956  W. VON STOESER  2,748,861
MEASURING TAPE FEED AND TAPE CUT-OFF
Filed June 16, 1950  5 Sheets-Sheet 4
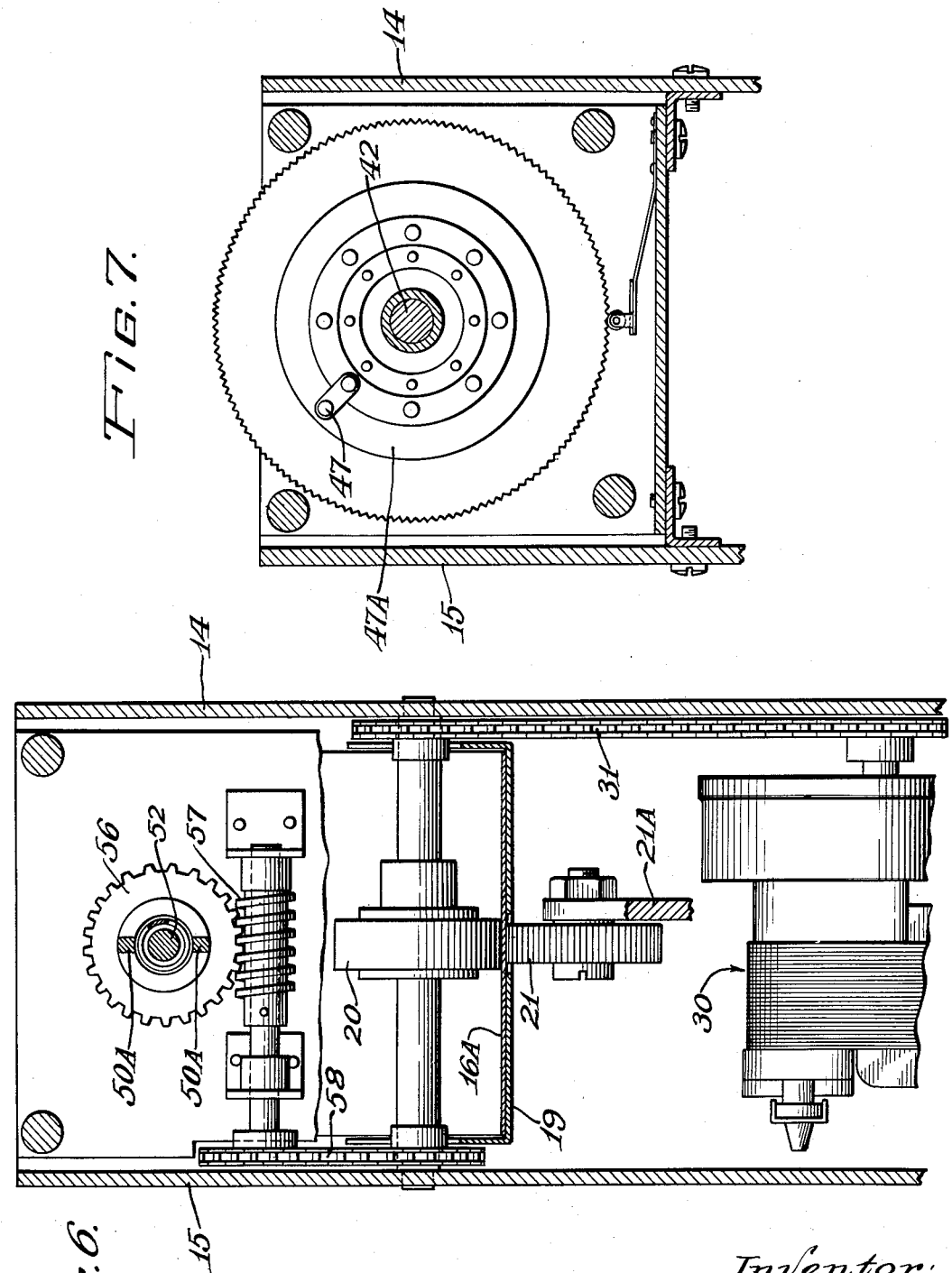

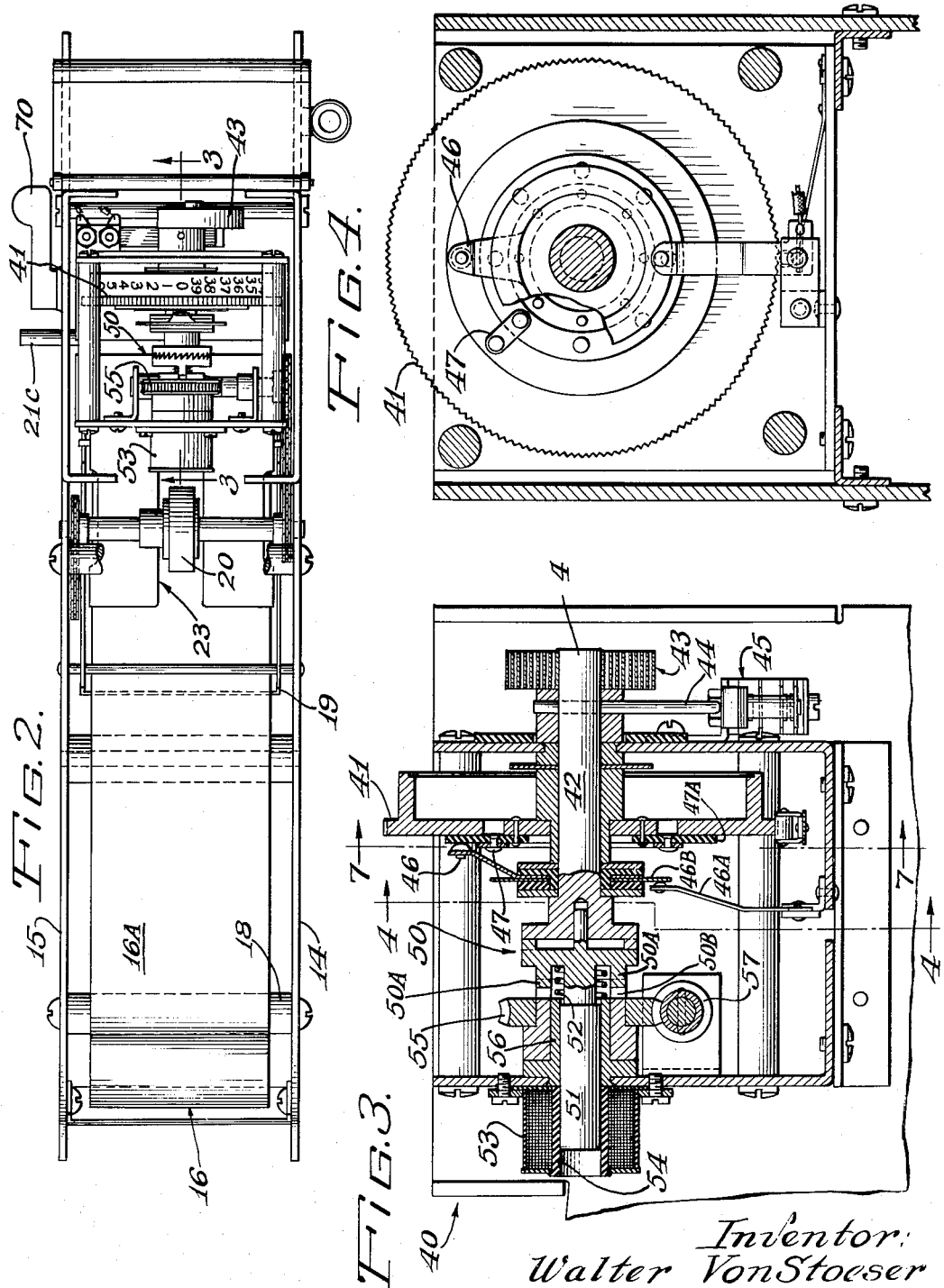

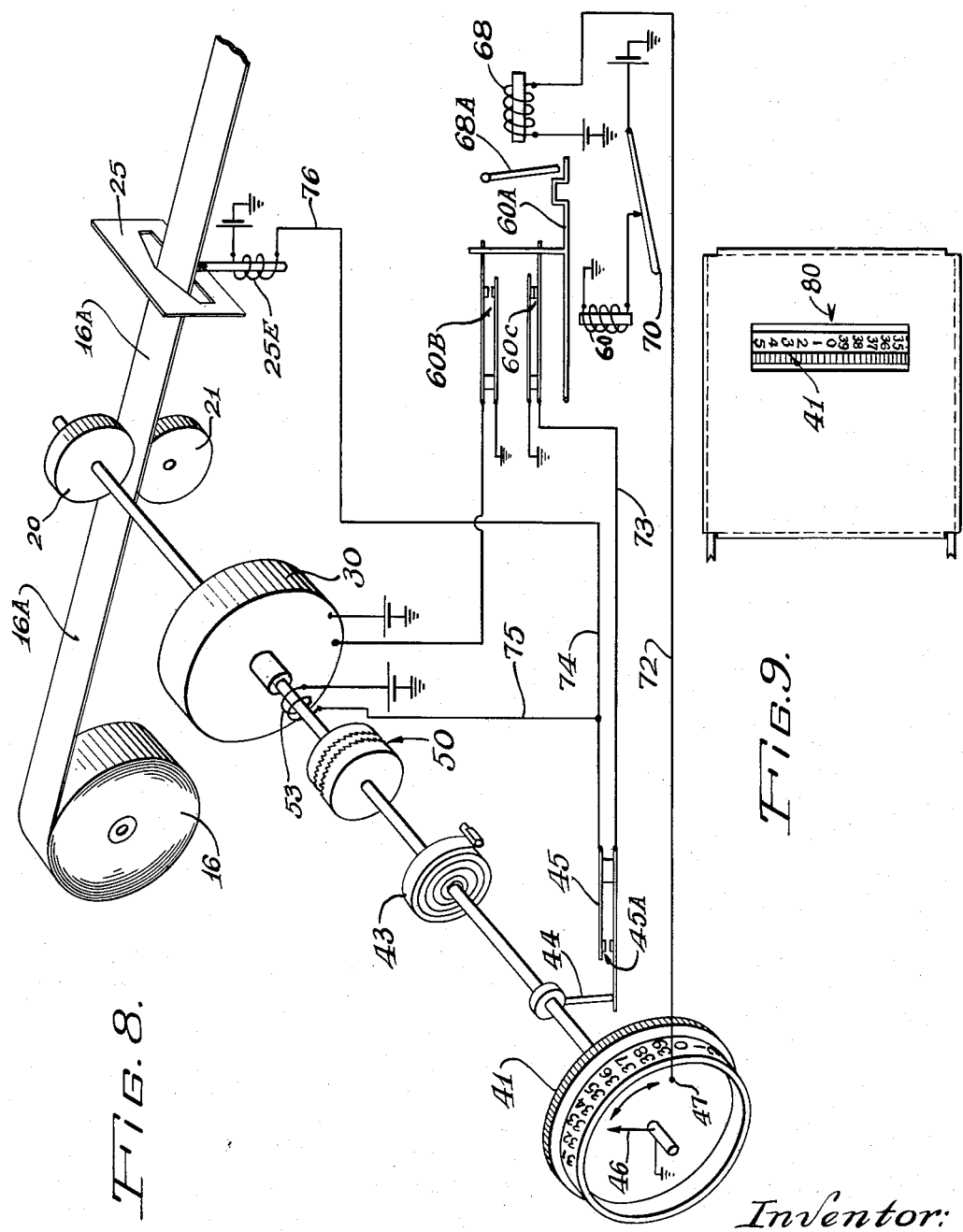

United States Patent Office 2,748,861
Patented June 5, 1956

2,748,861

MEASURING TAPE FEED AND TAPE CUT-OFF

Walter Von Stoeser, Venetian Village, Lake Villa, Ill., assignor to Lectromatic Devices, Inc., a corporation of Illinois Application June 16, 1950, Serial No. 168,565

18 Claims. (Cl. 164—49)

The principal object of this invention is the provision of a tape-feeding machine having automatic measuring and cut-off means with a preselector for determining the length of tape to be fed.

More detailed objects relate to the provision, in a machine for feeding gummed paper tape, and the like, of a feeding mechanism driven by an electric motor, an adjustable measuring switch for stopping the motor feed automatically when a desired length of tape has been fed; and automatic cut-off means for severing any length of tape fed under control of the measuring switch.

Additional objects relate to the provision of a control circuit for the measuring switch; to an automatic clutch means included in said circuit; to a preselecting means including a numbered dial indicating the length of tape to be fed; and to a rotary measuring switch cooperable with said dial and clutch for controlling the feeding motor and an electric magnetic tape-cutting device.

Other objects and aspects of novelty and utility pertain to details of the construction and operation of the compact, efficient, and automatic tape-feeding unit described hereinafter in view of the annexed drawings, in which:

Fig. 2 is a top plan view, to smaller scale than Fig. 1, of the complete machine, with cover plates removed;

Fig. 3 is a vertical sectional detail to full scale, of the measuring switch and clutch means as viewed in the direction of lines 3—3 of Fig. 2;

Fig. 4 is a cross-sectional detail through the control unit looking in the direction of lines 4—4 of Fig. 3 and showing the rear of the measuring switch and dial in elevation;

Fig. 6 is a vertical, fragmentary cross-section taken along lines 6—6 of Fig. 1 and looking at the motor, tape-feeding rollers, and measuring gear means;

Fig. 7 is a vertical, fragmentary cross-section looking in the direction of lines 7—7 of Fig. 3 and showing parts of the measuring switch in elevation;

Fig. 8 is a circuit diagram; and

Fig. 9 is a fragmentary top plan view of the cover plate index for the length-selecting dial.

Figure 1:
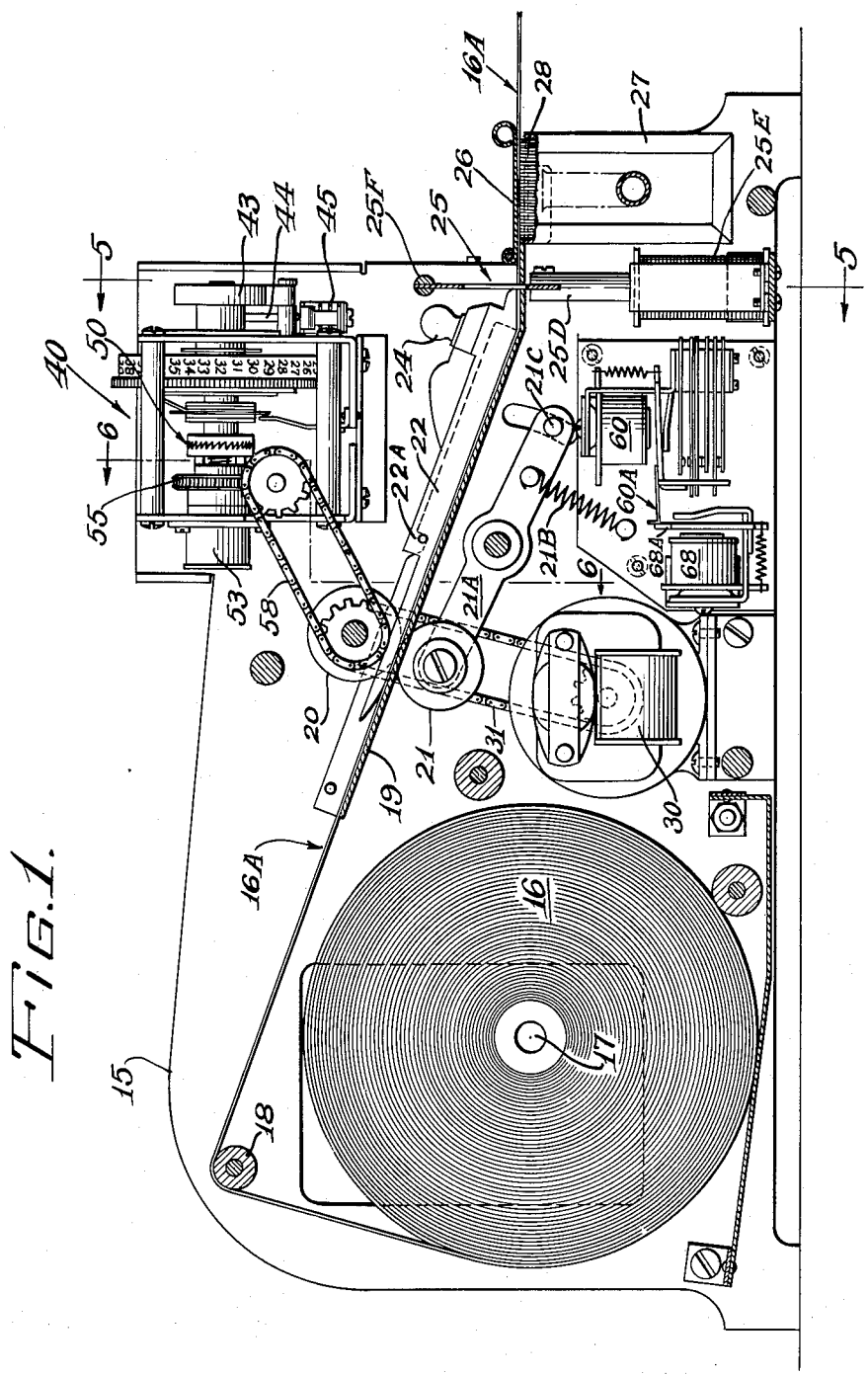
Fig. 1 is a vertical, longitudinal median section through the automatic tape-feeding machine, with parts shown in elevation and cover plates removed.

Referring to Figs. 1 and 2, the novel tape-feeding machine is of narrow, elongated, upstanding configuration, with its component mechanisms housed between a pair of upright side plates 14 and 15.

As viewed in Fig. 1, the usual roll 16 of gummed paper tape turns on a spindle 17, the tape leader 16A being led over a roller 18 onto a feeding apron 19 between feed-roller means including the driven roller 20 and a presser roller 21 (see also Figs. 2 and 6), the tape also passing beneath a weighted hold-down member 22, having a split tail, as at 23, Fig. 2, for passage of the feed roller 20, and also a handle means 24 (Fig. 1). Pin means 22A in hold-down 24 seat in slots in the apron to guide the hold-down into proper position and keep it away from the shear.

The tape leader 16A is then led forward beneath the shear or cut-off knife 25 and a second or moistening hold-down 26 overlying a removable water well 27 having brush means 28 therein to ride against the glued side of the tape leader and moisten the latter as it issues from the machine.

Means for feeding the tape includes an electric motor 30 carried between the plates, and driving the feed roller 20 through sprocket chain 31. The presser roller 21 idles on a rocker arm 21A which is urged by spring 21B to press the tape against the driven roller 20. A manipulating projection 21C (Fig. 5) passes through an arcuate slot in the frame wall to enable the separation of the rollers in feeding in a new tape leader.

Figure 5:
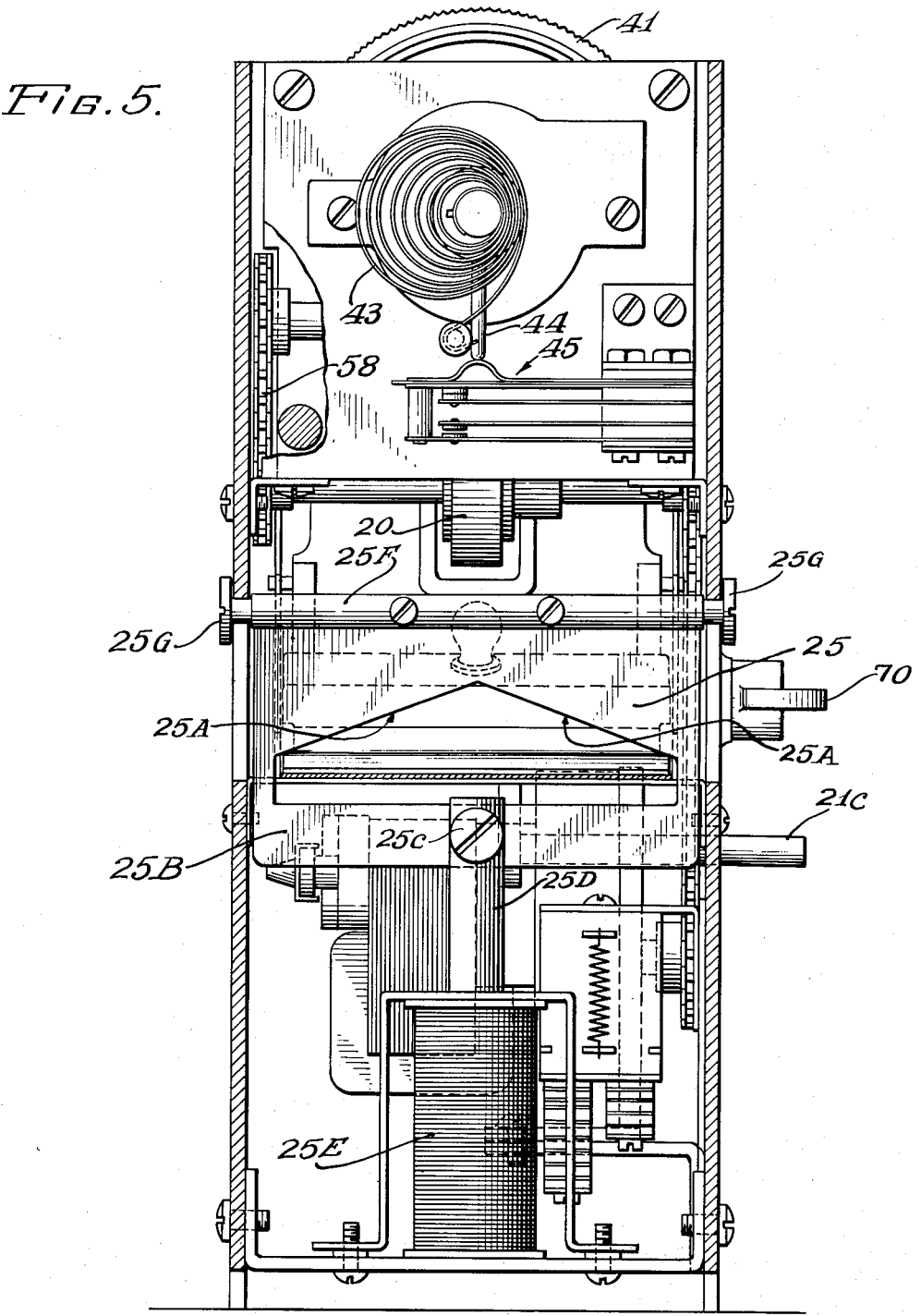
Fig. 5 is a vertical cross-section through the entire machine looking aft in the direction of lines 5—5 of Fig. 1 and showing in elevation the cut-off knife, the operating solenoid, and switch means therefor.

Means for cutting off the tape includes the vertically reciprocable knife 25, which, as depicted in Fig. 5, consists of a rectangular metal stamping having a somewhat triangular cut-out to provide diagonal shearing edges 25A and a lower marginal cross bar 25B which fits into a slot in the solenoid plunger 25D and is there held by screw 25C, the upper margin of this shear plate being fitted into a slotted rod 25F, the ends of which carry shoulder screws 25G to ride in vertical guide slots in the frame plates.

Thus, when the solenoid 25E is energized, the shear plate descends and is returned by action of a spring (not seen) in the solenoid bore.

Means for selectively measuring lengths of tape fed and sheared, includes the components of the control unit indicated generally at 40 in Fig. 1 and shown in detail in Fig. 3.

Referring to Fig. 3, there is provided a selecting dial 41 (see also Fig. 2) rotatable freely on a spindle 42, which has a normal or starting position determined by a clockspring 43.

Fast on the spindle 42 is a switch-operating pin 44 which actuates a shear control switch 45 upon return of the spindle to normal position by spring 43.

Also fast on spindle 42 is a rotary measuring switch arm 46 (see also Fig. 4) which cooperates with an adjustable measuring contact 47 on the measuring dial.

Rotary contact arm 46 has an index or starting position corresponding to the normal starting position of pin 44 (as in Fig. 3), whereas the adjustable dial contact 47 may be set in any position around 360° of displacement of the dial 41.

The circuit to the rotary contact 46 is effected by means of a wiper finger 46A (Figs. 3 and 4) riding on a wiper disc 46B in contact with finger 46. The circuit for the adjustable contact 47 is grounded to the frame through the metal of the arm 41 and spindle 42, said contact being disposed on a ring 47A of insulation.

Additional components of the measuring means are a toothed clutch 50 (Figs. 1, 2, 3), one-half of which is fast on the spindle 42, and the other and shiftable half of which is axially slidable as a part of plunger 51 against a spring 52 which normally tends to maintain the clutch engaged.

Clutch plunger 51 extends into the bore of a clutch solenoid 53, which is energizable to draw the shiftable half of the clutch out of engagement with its companion member.

Clutch plunger 51 is also in effect a stub shaft and rides in a sleeve bearing 54 in the bore of the solenoid 53. Rotatable coaxially of the plunger-shaft 51 is a gear 55 on stud bearing 56, and this gear is driven by a worm 57

(Figs. 3 and 6), which in turn is driven by a sprocket chain 58 taking off power from the spindle for tape-feed roller means 20 (Fig. 1 particularly).

The shiftable half of the clutch is provided with a pair of lugs 50A keying into slots 50B in the gear member 55, by means of which the clutch is positively driven.

The tape-feeding machine is completed by the provision of a control relay 60 (Fig. 1) and interlock means 68 therefor; and by the provision of a lever type operating switch 70 situated on the side of the machine. Cover plates, not shown, normally conceal the parts exposed to view in Figs. 2 and 5.

Operation and circuit

Referring to the diagrammatic showing of Fig. 8, the circuit is shown illustratively to employ the conventional grounded battery symbolism to indicate power and simplify the diagram; actually the machine is generally powered from the standard 110 v. A. C. mains.

Upon depressing lever switch 70, relay coil 60 is energized, causing its armature (Fig. 1) to be mechanically locked at 60A by the armature 68A of the interlock coil 68, thereby holding closed relay contacts 60B to start the motor 30.

At this time, normally closed relay contacts 60C, controlling power to the clutch and shear coils, are locked open.

At this time, also, the shear control zero switch 45 is held open by the index pin 44, it being assumed that the energization of motor 30 is just beginning due to closure of contacts 60B.

Since the clutch means 50 is normally engaged, feed roller 20 and its companion roller 21 now advance the tape relative to the shear plate 25 until the automatic cut-off means takes action.

Before pushing the start lever 70, the operator rotates the drum or dial 41 to position the indicia thereon relative to an index mark 80 on the cover plate, as illustrated in Fig. 9, the indicia in this instance representing inches of length.

The result of moving the selecting dial, as aforesaid, is to alter the angular relation between the rotary and adjustable measuring contacts 46 and 47.

The farther the selecting dial 41 has to travel before bringing contact 46 into engagement with contact 47 (within its one revolution of travel), the longer the tape will be, up to the limit of selection, which in the illustrative embodiment is 39 inches. By changing the ratio of gears 55 and 57 in relation to the diameter of the feed roller 20, the range of the selection as to length may be enlarged or reduced.

Assuming that the length-selection dial 41 has been set as aforesaid, when contact 46 engages contact 47, circuit will be closed via conductor 72 to energize the interlock coil 68 to attract its armature 68A and release the mechanical lock or hold-in at 60A, so that relay contacts 60B open, stopping motor 30, the contacts 60C close and apply power, via conductor 73 and the now closed supervisory shear and clutch switch contacts 45A (since pin 44 is now away from normal or index position), for energizing the clutch coil 53 via conductors 74—75, and permitting spring 43 to start turning the spindle 42 back to normal, starting position, since it is now free of the clutch.

At this time, also, normalizing or closure of supervisory contacts 45A extends power via conductors 74—76 to energize the shear solenoid 25E, causing shear plate 25 to descend and cut off the measured length of tape.

In the interim, the return of spindle 42 by clockspring 43 has restored the index finger or pin 44 to open the supervisory contacts 45A and deenergize the clutch coil 53 and shear coil 25E.

In summary, operation of the manual starting switch 70 actuates the interlock circuit to start the motor and set up subsequently effective operating circuits for the clutch and shear means to be actuated under control of the supervisory switch means 45 when the measuring switch, and particularly its shaft 42 and pin 44, is indexed following each release of the interlock circuit or control by closure of the index contact 46 with its adjustable or measuring contact 47 in the measuring switch.

The invention, in addition to affording improvements in particular feeding, shearing, and clutch mechanisms described, also provides improvements in a novel measuring means, including a measuring switch having one circuit component selectively set by hand, and another circuit component displaced relative to the first component in step with a feeding roller, or the like, and according to the length of tape fed, together with interlock and supervisory switch means controlled by the measuring switch and the means which drives it to automatically actuate a cut-off mechanism. It is contemplated that changes can be made in the detailed construction and arrangement of parts of the illustrative embodiment without departing from the fundamental scope of the invention disclosed and as set forth in the appended claims.

I claim:

1. In a measuring type tape feed of the class including tape feeding means and a driving motor therefor, with electromagnetically actuated shear to cut off fed lengths of tape, improvements in a control circuit comprising, to wit: a starting switch and relay means controlled thereby for starting said motor to effect a feeding of tape, and a manually settable measuring switch including adjustable contact means and rotary contact means displaced dependently upon feeding action of said feeding means, and actuating circuit means cooperative with said relay means for stopping said motor upon feeding of a length of tape determined by the manual setting of said measuring switch, together with supervisory contact means actuated automatically in cooperation with said measuring switch for actuating said shear following stoppage of the motor as aforesaid.

2 In a measuring type tape dispenser, feeding and cut-off mechanism comprising: feed roller means and a driving motor therefor, a manually controlled interlock circuit for starting said motor, an electrically controlled interlock release circuit for stopping said motor, a measuring switch including a cyclically operable index contact moved from an index position concomitantly with feeding action of said roller means together with a complementary pre-settable measuring contact engaged by said index contact during each operating cycle thereof, circuit means for releasably actuating said interlock circuit under control of said measuring switch contacts, an electrically actuated shear for severing the fed material, and a cut-off circuit including a switch closed to complete an operating circuit for said shear dependently upon operation of said interlock circuit to start the motor and rendered temporarily ineffectual by supervisory switch means held open under control of said measuring switch so long as said index contact is away from index position, and means under control of said interlock circuit for automatically restoring said index contact to index position following each measuring operation thereof to actuate said cut-off circuit.

3. In a tape dispenser of the type including tape feeding means driven by an electric motor, control means comprising: manually closed, electrically-releasable interlock circuit means operable from a normal condition to a locked condition for starting and running said motor; an adjustable measuring switch having movable contact means driven from an index position by action of said motor in synchrony with feeding action of said feeding means to preselected measuring positions to release said interlock circuit means to normal condition and stop said motor; an electromagnetically actuated shear for said tape and a shearing circuit therefor; an index switch and supervisory operating means therefor movable cooperatively with said movable measuring switch contact means for actuating the index switch to index and non-index conditions concomitantly with movements of said movable measuring switch contact means into and out of index positions, respectively, said shearing circuit being controlled jointly by said interlock circuit means in normal condition and said index switch in non-index condition to operate said shear; together with electromechanical means operable under joint control of said interlock circuit means in normal condition and said index switch in non-index condition for restoring said movable measuring-switch contact means and said supervisory switch-operating means to index positions.

4. Tape dispensing means including tape-feeding roller means, a motor driving said roller means, a measuring shaft driven by said motor from an index position, spring means normally urging said shaft into index position, a measuring switch including pre-settable contact means and index contact means displaceable by said shaft, an electrically-actuated cluch operable to free said shaft for indexing movement thereof, a supervisory switch operable from said shaft, an electrically-actuated shear, and a control circuit including said measuring switch contacts, said supervisory switch, a manual starting switch, and relay means for starting said motor, stopping the motor when a desired length of tape is fed as determined by setting of said measuring switch, actuating said clutch to restore said measuring switch to index position, and actuating said shear as an incident to restoration of the measuring switch to index position.

5. A tape dispenser comprising tape feeding means and a motor driving same, an operating circuit including a manual starting switch and a cooperating holding circuit effectuated thereby to operate said motor until said holding circuit is released, a measuring switch including manually settable contact means and index contact means moved from index position as a function of the feeding operation of said motor to effect release of said holding circuit and stoppage of the motor, electrically actuated indexing means operating under control of said manually settable contact means for restoring said index contact means to index position, and electrically tape cut-off means connected to be actuated by said index contact means dependently upon each indexing operation as aforesaid.

6. In a dispenser for roll tape and like materials and including feeding means for said materials driven by a motor, as well as an electrically actuated cutting means for said materials, control means comprising: an adjustable measuring switch including presettable measuring contact means and relatively movable contact means moved by said feeding means from a starting position to various preselected measuring positions; a starting and holding circuit for operating said motor in start-stop cycles; a starting switch for the holding circuit to start the motor; and circuit means controlled by said measuring switch contact means in said advanced positions for releasing said holding circuit to stop the motor; an index switch and operating means therefor moved with said movable contact means to actuate the index switch to an open condition when the movable contact means is in said starting position and to a closed condition when the movable contact means is in any advanced condition; electrically-energized cutting means and a cut-off circuit therefor closed by said index switch in the aforesaid closed condition thereof for permitting actuation of said cutting means automatically at least once during each aforesaid start-stop cycle of operation of said motor following stopping thereof under control of said holding circuit; together with supervisory circuit means controlled by said holding circuit in holding condition for preventing operation of the cutting means by said index switch until the holding circuit is released as aforesaid; together with means acting automatically on said movable measuring switch contact means for automatically returning same to said starting position following each stopping operation of the motor.

7. A tape dispenser including tape feeding means and a driving motor therefor, operable to feed a length of tape depending upon the amount of running of said motor, a first circuit including a manual switch and a releasable relay means including a first relay switch connected for cooperation for starting the motor, a second circuit including an adjustable measuring switch driven from said motor, and relay releasing means connected for operation to stop said motor after the same has run an amount determined by the adjustment of said measuring switch, an electrically operated shear, and a third circuit including a second relay switch operable by said relay means, together with a supervisory switch operated in conjunction with said measuring switch and circuit connections controlled by said second relay switch released for actuating said shear following each stoppage of said motor by release operation of said relay means under control of said second circuit and the measuring switch as aforesaid.

8. In a tape dispenser of the class described and which includes a feeding motor and tape feeding means driven thereby, control circuit means comprising, to wit: measuring switch means including an index finger displaced from a starting position in step with the feeding operation of said feeding means, said measuring switch means also including an index contact and an adjustable measuring contact settable in positions corresponding to the length of tape to be fed and moved in step with the aforesaid operation of the feeding means to engage said index contact; relay means including motor contacts and breaker contacts; a first circuit means and manual switch for actuating said relay means to operate said motor under control of said motor contacts; electrically controlled release means operable to release said relay means from actuated condition; a second circuit means controlled by said measuring switch contacts for operating said release means to release said relay and stop said motor; an electrically operated shear; circuit means for said shear including a supervisory switch caused to close by said index finger disposed away from said starting position jointly with said breaker contacts opened by said relay means while said motor is running and closed when the motor is stopped responsive to release of said relay means; and means for automatically moving said index contact and said index finger into said starting positions following each stoppage of the motor by the means aforesaid.

9. In a measuring type dispenser for roll material of the class including a feeding mechanism driven by an electric motor, a shear actuated by electromagnetic means, a control circuit comprising, to wit: a manually conditioned interlock circuit for starting and running said motor until the interlock is broken, an adjustable rotary measuring switch, having a starting position and actuated dependently upon the feeding action of said feeding mechanism to break said interlock circuit and stop said motor, a supervisory switch actuated by said measuring switch, and circuit means actuated responsive to breaking of said interlock and including said supervisory switch operated at the starting position of the measuring switch for energizing said electromagnetic shear means, and automatic means for restoring said measuring switch to said starting position and controlled by said interlock upon breaking thereof as aforesaid.

10. In an electrically powered machine for feeding gummed tape, which includes a feeding means and motor therefor; together with electrically operated shear, improvements in a control circuit including, namely: a relay switch connected for operation from a released condition to start said motor; a manual switch connected to operate said relay switch; an electrically releasable holding means coacting automatically with the relay switch to maintain the same in operated condition; electrically actuated release means for said relay switch holding means; an adjustable measuring switch including movable contact means driven in step with said feeding means and displaced from an index starting position various amounts depending on the adjustment of said switch, for feeding desired lengths of tape; a release circuit controlled by said movable contact means in displaced condition for actuating said release means; means including a circuit controlled by said relay switch in released condition for restoring said measuring switch and movable contact means thereof to said starting position responsive to release of the releasable means as aforesaid; and a supervisory shear-actuating switch operated under control of a circuit including said supervisory switch, operated by the measuring switch in said starting position, and by said relay switch in released conditon, for actuating said shear.

11. In a measuring type tape feeding machine having a feeding motor, an electrically actuated shear means, and an adjustable rotary measuring switch including a movble measuring control member coacting with said motor to move from a starting position pre-selected amounts to advanced measuring positions to effect stoppage of the motor; the combination of: a control circuit comprising, to wit, a starting circuit including a relay switch and a manually controlled switch for operating said relay switch to start said motor; releasable hold means cooperable with said relay switch and acting automatically following operation of said manual switch to hold said relay switch operated and maintain said starting circuit effective to continue operation of said motor; means actuated by said movable measuring member in any advanced measuring position for releasing said hold means; a shear circuit including a shear switch and shear contacts on said relay switch for actuating said shear means, said circuit being closed by joint action of said shear switch and closure of said shear contacts by said relay switch in released normal condition of the latter; means operatively controlled by said relay switch for restoring said movable measuring member to said starting position responsive to restoration of the relay switch to normal condition; shear-switch operating means coacting with said movable measuring control member for opening said shear switch only when the movable member is at starting position and for permitting closure of the shear switch while the movable member is away from starting position; said shear circuit being operatively closed in the interim occurring before return of said movable measuring member to starting position as aforesaid, and after release of said hold means.

12. In a tape feeding mechanism having a driving motor and an electrically actuated shear, a measuring control circuit comprising: a starting switch, an electrically operated and electrically released switch device operated from normally released condition by said starting switch; a shear switch; an operating circuit for said motor effectuated by said switch device in its operated condition; a measuring switch including a movable contact and a cooperating contact adjustable for predetermining lengths of tape to be fed; means actuated by said mechanism for moving said movable contact from an indexed starting position into engagement with said adjustable contact in step with the feeding of tape; indexing means actuated under control of said shear switch when closed, and said switch device in the released condition thereof for restoring said movable contact to said starting position; actuating means movable in step with said movable contact and effective in the starting position of the latter to open said shear switch; and a circuit effectuated by said movable contact in operative engagement with said adjustable contact for releasing said switch device from operated condition to actuate said indexing means and said shear.

13. In a measuring type tape-feeding machine of the class which includes tape-feeding mechanism with a driving motor therefor, an electrically actuated shear means, and an adjustable rotary type measuring switch movable commensurately with the length of tape fed, improvements in a control circuit comprising, to wit: a first circuit connected for actuation of said shear; a first and normally closed switch in said first circuit, restoring means for returning said measuring switch from off-normal measuring positions to a normal starting position; means movable in step with said measuring switch and operable in said normal starting position of the latter to hold said first switch open only while the measuring switch is in said starting position; a relay and circuit means for operating the same to energize said motor; a second switch in said first circuit and opened by the relay when the latter is in operated condition, whereby the shear is prevented from being actuated while said relay is operated to energize the motor as aforesaid; and circuit means operated by said measuring switch in off-normal measuring positions thereof for restoring said relay to non-operated condition, whereby to actuate said shear by closure of said second switch at a time when said first switch is closed by reason of the measuring switch being in an off-normal position, as aforesaid, so that the first switch will also be closed; said restoring means being controlled by said first and second switches in the aforesaid closed conditions thereof for restoring said measuring switch to said normal starting position as aforesaid.

14. In a measuring type tape-feeding machine including an electrically actuated tape cutter, circuit means for controlling the cutting of the tape and comprising: a first shaft and means driving the same in step with the feeding of tape by said machine; a second shaft coupled to the first shaft by a clutch having electrical release means; means yieldingly urging said second shaft to a starting position; a first circuit for energizing said cutter; a first and normally closed switch in said first circuit; angularly movable switch-actuating means positioned by said second shaft in said starting position thereof relative to said first switch for opening said first switch; a second switch in series with said first switch in said first circuit; electrically operated means for effecting opening and closing of said second switch; a manual switch for energizing said last-mentioned electrically operated means to open said second switch; and an adjustable rotary feed-measuring switch driven by said second shaft for energizing said electrically operated means to close said second switch at a time when said first switch is closed by movement of the second shaft away from starting position whereby to displace said switch-actuating means away from the first switch; and circuit means energized by said first and second switches in simultaneously closed condition for energizing said electrical clutch release means.

15. In a measuring type tape feeder including feeding mechanism driven by an electric motor; electromagnetically controlled cutter means and an adjustable measuring switch, a control circuit including, namely: interlock circuit means operatively conditioned by a starting switch for operating said feeding mechanism until the interlock is broken; a selectively adjustable measuring switch including traveling measuring contact means moving from a starting condition in step with the feeding travel of the tape to predetermined measuring positions to break said interlock and stop the feeding action of the feeding mechanism when the predetermined length of tape has been fed; a supervisory switch operatively controlled by a member moved in step with said measuring contact means to be in open-circuit condition when the measuring contact means is returned to said starting position, and to be in closed-circuit condition in all measuring positions of the measuring contact means; and cutter-controlling circuit means including connections with said supervisory switch and said interlock circuit means for actuating said cutter means in an interval between the breaking of said interlock circuit and opening of said supervisory switch upon return of the measuring contact means to starting position; together with means for automatically restoring the measuring contact means to starting position responsive to stoppage of the feeding mechanism as aforesaid.

16. In an electric tape feeding and measuring machine having feed mechanism driven by an electric motor and an electrically actuated tape cutter, control means comprising: a feed-control circuit including a starting switch, electrically releasable holding-circuit means having normally closed interlock contacts and actuated to holding condition by the starting switch to open said interlock contacts and further to close a held circuit to start feeding operation of said feed mechanism; an adjustable measuring switch including rotatable contact means advancingly moved from a starting position commensurately with the length of tape fed and connected in said feed control circuit for operation to effect release of said holding circuit means with consequent closure of said interlock contacts, and to open said held circuit and stop said feeding operation of the feed mechanism responsive to the feeding thereby of a length of tape for which said measuring switch has been adjusted; resetting means acting constantly to return said rotatable contact means automatically to said starting position in the absence of advancing effort acting thereon; a supervisory switch operably controlled by an index member moved in step with said rotary switch means to be opened near the starting position of the rotatable contact means and to be closed while the latter contact means is advanced away from the starting position; and an energizing circuit for said cutter controlled by said supervisory switch and said interlock contacts to operate the cutter automatically in an interval between release of the holding circuit means and return of the rotatable contact means to starting position during which said supervisory switch and said interlock contacts are both closed.

17. In an electric tape feeder, adjustable measuring switch means including movable contact means connected to control an electromagnetic tape feeding means and driven cooperatively with the latter advancingly from a starting position to preselected measuring stop positions, commensurately with the length of tape fed, to engage a presettable measuring contact and actuate circuit means to stop feeding action of said feeding means upon reaching any of said stop positions; an electromagnetically controlled cutter and a cutter-operating circuit including two switches connected to require operation of both to actuate the cutter, one of said switches being operatively controlled by supervisory means driven in step with said movable contact means to be in closed condition only while said movable contact means is away from starting position, and the other of said switches being controlled by said measuring switch and operated to closed condition responsive to movement of said movable contact means into any of said preselected stop positions, together with reset means actuated under control of said movable contact means in engaging said measuring contact for restoring said movable contact and said supervisory means to said starting position.

18. Tape-feeding and cut-off apparatus including a motor-driven tape-feeding mechanism; circuit means including a manual starting switch and relay means initially operated thereby for starting feeding action of said feeding mechanism; an adjustable measuring switch including movable contact means having control connection with said circuit means and further having a starting condition and an advanced measuring condition and adapted to be selectively adjusted to stop the feeding action initiated as aforesaid responsive to feeding of measured lengths of tape for which it is adjusted; electrically controlled tape cutter means; a power connection for said cutter means normally completed by said relay means in the non-operated condition thereof; a normally closed supervisory switch in series with said power circuit; means moved in step with said movable contact means of the measuring switch and acting only in the starting position of the latter to open said supervisory switch and interrupt said cutter power circuit; means controlled by said measuring switch for restoring said relay means from operated to non-operated condition as a function of each measuring operation of the measuring switch; and means operated to restore the movable contact means to starting position automatically in the time following restoration of the relay means to non-operated condition and prior to opening of the supervisory switch as aforesaid.

References Cited in the file of this patent

UNITED STATES PATENTS

| | | |
|---|---|---|
| 1,731,403 | Weaver | Oct. 15, 1929 |
| 1,871,119 | Denmire | Aug. 9, 1932 |
| 1,960,945 | Krueger | May 27, 1934 |
| 2,065,939 | Landrock | Dec. 29, 1936 |
| 2,133,868 | Morton et al. | Oct. 18, 1938 |
| 2,298,492 | Longfield | Oct. 13, 1942 |
| 2,408,363 | Beckman | Oct. 1, 1946 |